(12) United States Patent
Ono et al.

(10) Patent No.: US 6,869,655 B1
(45) Date of Patent: Mar. 22, 2005

(54) OPTICAL RECORDING MEDIUM

(75) Inventors: Toshitsugu Ono, Miyagi (JP);
Hirofumi Kondo, Miyagi (JP);
Tetsuhiro Sakamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/543,844

(22) Filed: Apr. 5, 2000

(30) Foreign Application Priority Data

Apr. 7, 1999 (JP) .......................................... P11-100656

(51) Int. Cl.$^7$ .......................... B32B 3/02; B32B 19/00; G11B 7/24; G11B 7/26; G03C 3/00
(52) U.S. Cl. ................... 428/64.1; 428/64.2; 428/64.4; 428/64.9; 430/270.11; 430/495.1; 430/945; 369/283; 369/288
(58) Field of Search ................ 428/64.1, 64.2, 428/64.4, 64.9, 702, 913; 430/270.11, 495.1, 945; 369/283, 288

(56) References Cited

U.S. PATENT DOCUMENTS

| | | | | |
|---|---|---|---|---|
| 5,536,425 A | * | 7/1996 | Kondo et al. ............. | 252/62.51 |
| 5,864,357 A | * | 1/1999 | Akutsu ...................... | 347/262 |
| 6,063,468 A | * | 5/2000 | Aratani et al. ............. | 428/64.1 |
| 6,246,656 B1 | * | 6/2001 | Kawakubo et al. ....... | 369/112.23 |
| 6,309,726 B1 | * | 10/2001 | Ono et al. ................. | 428/64.1 |

FOREIGN PATENT DOCUMENTS

| | | |
|---|---|---|
| JP | 1112547 | 5/1989 |
| JP | 4222448A1t | 1/1993 |
| JP | 06009976 | 1/1994 |
| JP | 09241668 | 9/1997 |

* cited by examiner

*Primary Examiner*—Rena Dye
*Assistant Examiner*—Lawrence Ferguson
(74) *Attorney, Agent, or Firm*—Sonnenschein, Nath & Rosenthal LLP

(57) ABSTRACT

An optical recording medium in which deposition of impurities or damage to a surface of the medium illuminated by the light for signal recording and/or reproduction is to be prevented from occurring. An amine salt compound of perfluoropolyether having terminal carboxylic groups, represented by the chemical formulas (1) and/or (2):

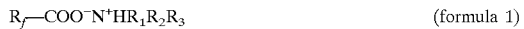

(formula 1)

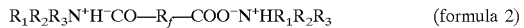

(formula 2)

where $R_f$ denotes a perfluoropolyether group and $R_1$, $R_2$ and $R_3$ denote hydrogen or a hydrocarbon group, is held on the surface side illuminated by light.

24 Claims, 8 Drawing Sheets

OPTICAL RECORDING MEDIUM

RELATED APPLICATION DATA

The present application claims priority to Japanese Application No. P11-100656 filed Apr. 7, 1999 which application is incorporated herein by reference to the extent permitted by law.

BACKGROUND OF THE INVENTION

1. Field of the Invention

This invention relates to an optical recording medium having a recording portion for signal recording, formed on one of the major surfaces of a support and a light transmitting layer formed on the recording portion. The light is illuminated from the side of the light transmitting layer to record and/or reproduce information signals.

2. Description of the Related Art

An optical recording medium on one surface of which recording and/or reproduction for four hours is possible in accordance with the NTSC (National Television System Committee) has so far been proposed. In this manner, the optical recording medium has the function as a new recording medium which takes the place of a video tape cassette used in the current VTR (video tape recorder).

On the other hand, a demand is raised to make the shape or the size of an optical recording medium equivalent to those of a CD (Compact Disc) to render the recording medium more friendly to the user accustomed to the ease in handling and usability of the CD. On the other hand, a demand is raised to constitute the optical recording medium as a disc-shaped recording medium similar to a CD to exploit random-accessibility and fast accessing proper to the disc configuration to provide a recording medium which is small-sized and easy to operate, capable of instantaneous recording and/or reproduction and which has diversified functions such as tricky play or prompt editing.

The optical recording medium is required to exhibit diversified capabilities and properties, for use as the next-generation recording medium, and hence is in need of e.g., a recording capacity of not less than 8 GB.

However, the recording capacity of a conventional optical recording medium is not larger than 8 GB. As a conventional optical recording medium, a DVD (Digital Versatile Disc) has already been proposed. In DVD, the recording wavelength $\lambda$ is 0.65 $\mu$m, the numerical aperture NA is 0.6 and the recording capacity is 4.7 GB.

If, with equivalent signal formats, such as the ECC (error correction code) or the modulation system, to those of the DVD, the recording capacity of an optical recording medium is to be not less than 8 GB, the relationship:

$$4.7 \times (0.65/0.60 \times \lambda)^2 \geq 8$$

needs to be met. By solving this formula, $NA/\lambda \geq 1.20$. Therefore, if, in an optical recording medium, the recording capacity is to be not less than 8 GB, the numerical aperture NA needs to be of a larger value, or the recording wavelength $\lambda$ needs to be smaller.

If, in an optical recording medium, the numerical aperture NA is of a larger value, the allowance of the angle with which the disc surface deviates from the optical axis of the optical pickup (tilt angle) is diminished. Thus, in above-described optical recording medium in which the aberration due to the thickness of the disc surface tends to be affected by the tilt angle, the light transmitting layer through which is transmitted the illuminating light needs to be reduced to achieve stabilized signal recording and/or reproduction. In the optical recording medium, thickness variations in the light transmitting layer need to be smaller than a pre-set value, for the same reason.

The optical recording medium has a merit that, if the light transmitting layer is reduced in thickness, a higher recording density is achieved. It has, however, a drawback that it tends to be affected significantly by scratches or dust and dirt on the disc surface to render signal recording and/or reproduction difficult. That is, if, in an optical recording medium, recording and/or reproduction is to be performed using an optical system of high recording density employing an objective lens of high numerical aperture, it is necessary to reduce the working distance, that is the distance between the objective lens and the recording and/or reproducing surface of the disc, in comparison with that of a conventional optical recording medium. At this time, the optical recording medium tends to be damaged due to the increased probability of collision between the disc surface and the objective lens. In such case, the amount of dust and dirt affixed to the disc surface of the optical recording medium is increased due to electrification of the disc surface. The result is the increased rate of the recording and/or reproducing errors due to scratches or the dust and dirt on the disc surface.

SUMMARY OF THE INVENTION

It is therefore an object of the present invention to provide an optical recording medium in which scratches or deposition of dust and dirt on the disc surface may be inhibited to reduce the recording and/or reproducing errors.

The present invention provides an optical recording medium including a support, a recording portion formed on one of the major surfaces of the support for recording signals thereon and a light transmitting layer formed on the recording portion. The signals are recorded and/or reproduced by illuminating light from the side of the light transmitting layer. An amine salt compound of perfluoropolyether having a terminal carboxylic group, represented by the chemical formulas (1) and/or (2):

  (formula 1)

  (formula 2)

where $R_f$ denotes a perfluoropolyether group and $R_1$, $R_2$ and $R_3$ denote hydrogen or a hydrocarbon group, is deposited on the surface of the side illuminated by light.

With the optical recording medium, it is possible to reduce the frictional coefficient on the medium surface and surface resistance as well as damage to or dust deposition on the medium surface.

Also, with the optical recording medium of the present invention, in which the amine salt compound of perfluoropolyether having a terminal carboxylic group is held on the surface side of the medium illuminated with the light for signal recording and/or reproduction, it is possible to prevent damage or dust deposition to this surface. The result is that there is no risk of the recording and/or reproducing error being increased even if the working distance is reduced, and hence there may be provided a large-capacity recording medium that is able to cope with high density recording.

DESCRIPTION OF THE PREFERRED EMBODIMENTS

Figure 1:
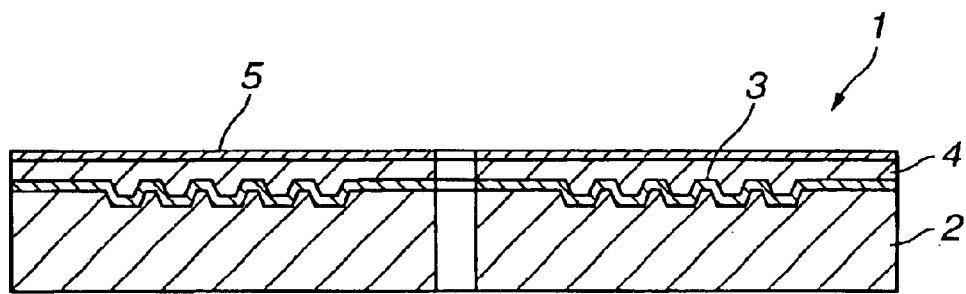
FIG. 1 is a cross-sectional view showing a first illustrative embodiment of an optical recording medium according to the present invention.

Referring to the drawings, preferred embodiments of the present invention will be explained in detail. In the following explanation, the optical recording medium is a disc-shaped optical recording medium in which light is illuminated from the side of the light transmitting layer formed on a support having a signal information portion to record and/or reproduce the signals. This invention is, however, not limited to this particular embodiment and may be applied to a variety of optical recording mediums, such as a card- or sheet-shaped recording medium.

FIG. 1 shows an illustrative structure of an optical disc embodying the present invention. This optical disc 1 includes a substrate 2, a reflective film 3 formed on one major surface of the substrate 2, a light transmitting layer 4 formed on the reflective film 3 and a surface layer 5 formed on the light transmitting layer 4.

The substrate 2 is molded to a disc shape by injection molding from a resin material, such as polycarbonate. This optical disc 1 is a replay-only disc, or a so-called ROM (read-only disc), that is a disc the substrate 2 of which is formed as one with a pre-set pattern of crests and recesses consistent with recording signals at the time of molding by injection molding.

The reflective film 3 is formed as a thin film on the surface of the substrate 2 carrying the pattern of the crests and recesses. This reflective film 3 is formed of a material exhibiting superior reflectance to the light incident thereon for recording and/or reproduction, such as, for example, a metal material, inclusive of Al.

The light transmitting layer 4 is formed on the reflective film 3. This light transmitting layer 4 is formed using a UV light curable resin, such as, for example, a resin manufactured by DAINIPPON INK CO. LTD. under the trade name of SD301. In the optical disc signals are reproduced by illuminating light from the light transmitting layer 4 towards the above-mentioned pattern of crests and recesses.

Meanwhile, in recording and/or reproducing the optical disc 1 to high recording density, an optical system having a high NA objective lens, as later explained, is required to be used. In this case, it is necessary to narrow the distance between the objective lens and the light incident side surface of the optical disc 1, that is the working distance, in comparison with that in a conventional optical disc. If the working distance is smaller, the objective lens tends to be damaged due to collision against the light incident side surface of the optical disc 1.

Thus, in this optical disc 1, a light-transmitting surface layer 5 having a pre-set hardness is formed on the light transmitting layer 4. This prohibits the light incident side surface of the optical disc 1 from being damaged on collision of the optical disc 1 on the objective lens. This surface layer 5 is formed of a material having hardness sufficient to prevent damage to the optical disc 1, such as an inorganic material, inclusive of $SiN_x$, $SiO_x$ or SiC.

This surface layer 5 desirably has a thickness of 1 to 200 nm, specifically, 100 nm. If, in the optical disc 1, the thickness of the surface layer 5 is less than 1 nm, it becomes difficult to prevent damage of the surface layer 5 due to contact with the objective lens. On the other hand, if the thickness of the surface layer 5 exceeds 200 nm, the working distance is increased to render it difficult to achieve high recording density.

In addition, the surface hardness of the surface layer 5 is desirably not less than H in terms of pencil hardness. The results of a collision test against a pickup have indicated that, if the light incident side surface of the optical disc 1 has a pencil hardness not less than H, the optical disc is not damaged on collision against the objective lens. It is furthermore desirable that the surface hardness of the surface layer 5 is not less than 2H in terms of pencil hardness. This effectively prohibits the optical disc 1 from being damaged due to contact with the objective lens.

It is also desirable that the surface layer 5 exhibits electrical conductivity. If the light transmitting layer 4 of the optical disc 1 is of a reduced thickness, dust and dirt tend to be affixed thereto, so that it is crucial for the surface layer 5 to exhibit anti-electrification characteristics. In the optical disc 1, in which the surface layer 5 exhibits electrically conductivity, it is possible to prevent electrification of the light incident side surface and resulting dust deposition. The surface layer 5 can be sufficiently electrically conductive by being formed of, for example, indium oxide, tin oxide, either alone or in combination, or amorphous carbon. The surface layer 5 may be approximately of a thickness of, for example, 50 nm.

The optical disc 1 holds, on the surface of the surface layer 5, an amine salt compound of perfluoropolyether having carboxyl terminal groups, as shown by the following formula (1) and/or (2):

$$R_f-COO^-N^+HR_1R_2R_3 \quad \text{(formula 1)}$$

$$R_1R_2R_3N^+H^-CO-R_f-COO^-N^+HR_1R_2R_3 \quad \text{(formula 2)}$$

where $R_f$ denotes a perfluoropolyether group and $R_1$, $R_2$ and $R_3$ denote hydrogen or a hydrocarbon group, is deposited on the surface of the side illuminated by light.

With the optical disc 1, the electrical resistance and the frictional coefficient on the disc surface can be reduced by the compounds of the above formulas (1) and/or (2) being held on its surface layer 5. That is, the above compounds are used as a lubricant.

These compounds can be prepared by the following method. That is, perfluoropolyether $R_f$—COOH or HOCO—$R_f$—COOH and an amine $NR_1R_2R_3$ are mixed together to give equimolar amounts of carboxylic acid and amine and are evenly dissolved under agitation to give the above compounds. In this case, heat may be applied, if necessary.

The perfluoropolyether, having a terminal carboxylic group, may be exemplified by one having the main chain $R_f$ of the following structural formulas (1), (2) and (3):

$$F(CF_2CF_2CF_2O)_i \quad \text{(structural formula 1)}$$

$$CF_3(OCFCF_2)_m(OCF2)_n \atop |\phantom{CF_3(OCF}CF_3} \quad \text{(structural formula 2)}$$

$$F(CFCFO)_j \atop |\phantom{F(C}CF_3} \quad \text{(structural formula 3)}$$

where i, j, m and n denote integers not less than 1.

It is noted that each of the structures represented by the structural formulas (1) to (3) is a monofunctional perfluoropolyether group having a carboxylic group on its one terminal. The main chain $R_f$ may also be a di-functional perfluoropolyether group having carboxylic groups on its both terminals:

$$(OC_2F_4)_p(OCF_2)_q \quad \text{(structural formula 4)}$$

where p and q denote an integer not less than 1.

However, the compounds of the present invention are not limited to the main chain $R_f$ having the structure as indicated by the structural formulas (1) to (4).

The main chain $R_f$ is preferably of a molecular weight approximately of 600 to 5000. If the molecular weight is not larger than 600, the effect of the perfluoropolyether group is diminished. On the other hand, if the molecular weight is not less than 5000, the meritorious effect of the terminal group is diminished.

At least one of $R_1$ to $R_3$ in the above formulas (1) and (2), representing hydrogen or a hydrocarbon group, is desirably a long-chain hydrocarbon group with the number of carbon atoms not less than 10. Thus, the compound of the present invention is optimally soluble in an organic solvent, such as alcohol or hexane, while being decreased in the surface energy. Therefore, if the compound of the present invention is used as a lubricant for the optical disc 1, it can be coated easily on the surface layer 5, while exhibiting optimum lubricating action to diminish the frictional coefficient.

It is noted that, if $R_1$ to $R_3$ in the above formulas (1) and (2) represent hydrocarbon groups, these may be any one of a saturated hydrocarbon group, a non-saturated hydrocarbon group and an aromatic hydrocarbon group. In order for the above compounds to display sufficient lubricating properties, at least one of these groups is preferably a long-chain hydrocarbon group.

The compound of the present invention, having an ionic bond in its molecule, exhibits extremely strong adhesion to the surface layer 5 of the optical disc 1. Thus, if the objective lens collides against the surface layer 5 of the optical disc 1 frequently, its lubricating effect can be maintained over a long period, and hence the compound is highly effective in view of maintaining the durability of the optical disc 1. On the other hand, the adhesion of the compound to the surface layer 5 is increased if the surface layer 5 is formed of an inorganic material, such as $SiN_x$, SiC or $SiO_x$, because these inorganic materials exhibit a high surface energy and hence a high bonding force to the above-mentioned compounds.

Also, the compound of the present invention, having an ionic bond in its molecule, is able to suppress electrically conductivity of the surface layer 5. Thus, if the number of times of collision between the optical disc and the objective lens is many, it is possible to prevent electrification of the surface layer 5 and hence to suppress dust deposition thereon. It is therefore possible with the optical disc to prohibit errors from being produced during recording and/or reproduction due to, for example, dust deposition.

The compound used as a lubricant for the optical disc 1 may be used singly or in combination with a variety of routine lubricating materials, as discussed above. It may also be used in combination with, for example, perfluoroalkyl carboxylic acid esters, carboxylic acid perfluoroalkyl esters, perfluoroalkyl carboxylic acid perfluoroalkyl esters, or derivatives thereof.

The optical disc 1 preferably has a dynamic frictional coefficient on the recording medium surface, that is on the surface of the surface layer 5, equal to 0.3 or less. This prevents the surface of the optical disc 1 from being damaged if it is slidingly contacted with the objective lens.

In the present embodiment, the compounds represented by the formulas (1) and/or (2) is coated on the surface layer 5 of the optical disc 1. For coating these compounds on the recording medium surface, the compounds are dissolved in a solvent to give a solution which then is applied on the recording medium surface. Alternatively, the solvent may be sprayed onto the recording medium surface. Still alternatively, the optical disc 1 may be immersed in this solution to hold the above-mentioned compound on the recording medium surface.

Preferably, the electrical resistance of the surface of the optical disc 1 is not higher than $10^{13}$ Ω. This realizes a sufficient anti-electrification effect.

Meanwhile, the surface layer 5 is not limited to the above-mentioned inorganic materials, but may be formed of an organic resin, such as an acrylic urethane based UV light curable resin. For forming the surface layer 5 from an organic resin, the organic resin may be coated on the light transmitting layer 4 by a spin coating method and UV rays are illuminated thereon for curing the resin.

For forming the surface layer 5 from an organic resin, its thickness is desirably 0.1 to 10 μm. If the surface layer 5 is of a thickness thicker than 10 μm, thickness variations tend to be produced in the surface layer 5. If the surface layer 5 is thinner than 0.1 μm, it is difficult to improve the surface hardness of the optical disc 1 sufficiently. If the surface layer 5 has the thickness of 0.1 to 10 μm, the optical disc 1 can be improved in surface hardness without producing thickness variations.

If the surface layer 5 is formed of an organic resin, powders of oxides of at least one of the metals are desirably mixed into the resin. This decreases the electrical resistance of the surface layer 5 to improve anti-electrification effects.

If the surface layer 5 is formed of an organic resin, wettability of the interface between the surface layer 5 and the light transmitting layer 4 poses a problem. Therefore, the surface layer 5 is preferably formed of a material having surface tension lower than that of the critical surface tension of the light transmitting layer 4, as disclosed in Japanese Laying-Open Patent H-6-52576 entitled "optical recording disc and manufacturing method therefor". If the surface layer 5 is formed of a material having a surface tension lower than the critical surface tension of the light transmitting layer 4, it is possible to prevent the wetting between the light transmitting layer 4 and the surface layer 5 to maintain adhesion between the light transmitting layer 4 and the surface layer 5.

If the light transmitting layer 4 is formed of the UV light curable resin and the surface layer 5 is formed of an organic resin, these layers are desirably adjusted as to the water absorption ratio. That is, since it is necessary to avoid corrosion of the reflective film 3, the light transmitting layer 4 is preferably formed of a material having a lower moisture absorption ratio. On the other hand, since it is crucial with the surface layer 5 to improve hardness of the light incident side surface and to prevent electrification, the surface layer 5 needs to exhibit low electrically conductivity. In order to realize this, it is desirable that ions contributing to electrical conduction be contained in the surface layer 5, so that a material having the moisture absorption ratio higher than that of the light transmitting layer 4 needs to be used for the surface layer 5.

Figure 2:
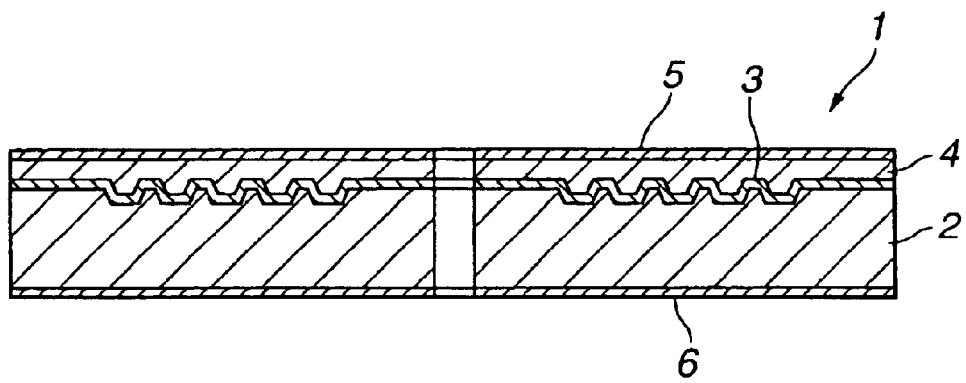
FIG. 2 is a cross-sectional view showing a second illustrative embodiment of an optical recording medium according to the present invention.

It is possible for the optical disc 1 to have a skew correcting member 6 on the surface of the substrate 2 opposite to its side carrying the light transmitting layer 4, as shown in FIG. 2. By having the skew correcting member 6, it is possible to reduce the possibility of occurrence of skew in the optical disc 1. This skew correcting member 6 is formed by coating and curing e.g. a UV curable resin. The material of the skew correcting member 6 may be the same as that of the light transmitting layer 4, or may be higher in its curing contraction ratio than the material of the light transmitting layer 4.

The conditions under which the recording density of the above-described optical disc 1 can be increased are hereinafter explained.

In general, the disc skew margin $\Theta$, wavelength $\lambda$ of the recording and/or reproducing system, the numerical aperture NA and the thickness t of the light transmitting layer 4 are correlated with one another. The relationship between these parameters and $\Theta$ is stated in Japanese Laying-Open Patent H-3-225650, taking, as a reference, a compact disc CD, the playability of which has been proven sufficiently. That is, it suffices if $$|\Theta| \leq 84.115(\lambda/NA^3/t)$$

which may be applied to the optical disc 1 embodying the present invention.

It is noted that a specified threshold value of the skew margin $\Theta$ is reasonably 0.4° in really mass-producing the optical disc, because the skew margin $\Theta$ smaller than this lowers the yield of the disc in mass production, thus raising the cost. With the pre-existing optical recording medium, it is 0.6° and 0.4° for a CD and for a DVD, respectively.

Therefore, if it is calculated how the thickness of the light transmitting layer 4 is to be set, for $\Theta=0.4°$, by reducing the wavelength and by increasing the NA, the value of NA not lower than 0.78 is required for $\lambda=0.65$ μm. From this, $t \leq 288$ μm is derived.

If the case of $\lambda=0.4$ μm is considered in view of the trend in future towards shorter light wavelength, $t \leq 177$ μm on the supposition that $NA \geq 0.78$ is kept. If, in this case, the manufacturing equipment for a CD with the 1.2 mm thickness of the substrate 2 is directly utilized, the thickness of the optical disc 1 embodying the present invention is approximately 1.38 mm at the maximum.

If magnetic field modulation in the case of the optical disc 1 provided with a signal recording layer for recording and/or reproducing magnetic signals, with the optical disc 1 used being a magneto-optical disc, is considered, a thinner thickness of the light transmitting layer 4 is desirable. In more detail, if the thickness of the light transmitting layer 4 is set to, for example, 30 μm, recording and/or reproduction by the magneto-optical disc is facilitated.

The lower limit of the thickness of the light transmitting layer 4 may be determined depending on the protective function of the light transmitting layer having the role of protecting the signal recording layer or the reflective film 3. It is desirable that, in view of reliability and the effect of collision of the double lens set as later explained, the thickness of the light transmitting layer 4 be not less than 10 μm.

For raising the recording density of the optical disc 1, it is mandatory to increase the NA/$\lambda$ ratio, as discussed above. For example, if the recording capacity of 8 GB is to be achieved, it is mandatory that the NA be at least 0.7 and that the light wavelength $\lambda$ be not larger than 0.68 μm. Although the above-mentioned relationship holds between the thickness of the light transmitting layer 4 and the skew, the thickness t of the light transmitting layer 4 is appropriately set to 10 to 177 μm in order to accommodate the wavelength range from the red laser light in current use to the blue laser light which will be used in future.

Also, for achieving the recording capacity of 8 GB, it is necessary to change the track pitch P and the line density d. The condition therefor is:

$$(0.74/P) \times (0.267/d) \times 4.7 \geq 8$$

such that $$d \leq 0.1161/P \text{ bit}/\mu m.$$

For P=0.56 μm, $d \leq 0.206$ bit/μm. This is based on the ROM (read-only memory) of the DVD as a reference. However, if the future progress in the signal processing technique for recording and/or reproduction, such as application of PRML (partial response maximum likelihood) or reduction of redundancy of ECC (error correction code) is taken into account, it may be expected to increase the line density by 15% or so to increase the track pitch P correspondingly. Form this, the maximum track pitch P of 0.64 μm is derived.

Also, the allowance of the pitch variations Δp becomes stringent. If the recording and/or reproducing parameters for the CD or the DVD are directly used, $$|\Delta p| \leq 0.03P/0.74 = 0.04P$$

so that, if P=0.56, $|\Delta p| \leq 0.023$ μm.

Furthermore, a higher precision is required of the thickness variations of the light transmitting layer 4. Supposing that the thickness of the light transmitting layer 4 is offset from the design center of the recording and/or reproducing objective lens, the amount of the aberration which the thickness variations afford to the spot is proportionate to the fourth power of NA and to the wavelength.

Therefore, if high recording density is to be achieved by higher NA or the shorter wavelength, more stringent limitations are imposed on the thickness variations of the light transmitting layer 4. As specified example, NA=0.45 is practically used for the CD, while the standard for the thickness variation of the light transmitting layer 4 is ±100 µm.

As for the DVD, the thickness variation of the light transmitting layer 4 for NA=0.6 is prescribed to be ±30 µm. If the allowance for a CD of ±100 µm is taken as a reference, the thickness variation is expressed by the following equation:

$$|\Delta t|=(0.45/NA)^4 \times (\lambda/0.78) \times 100 = 5.26 \times (\lambda/NA^4) \mu m.$$

Figure 3:
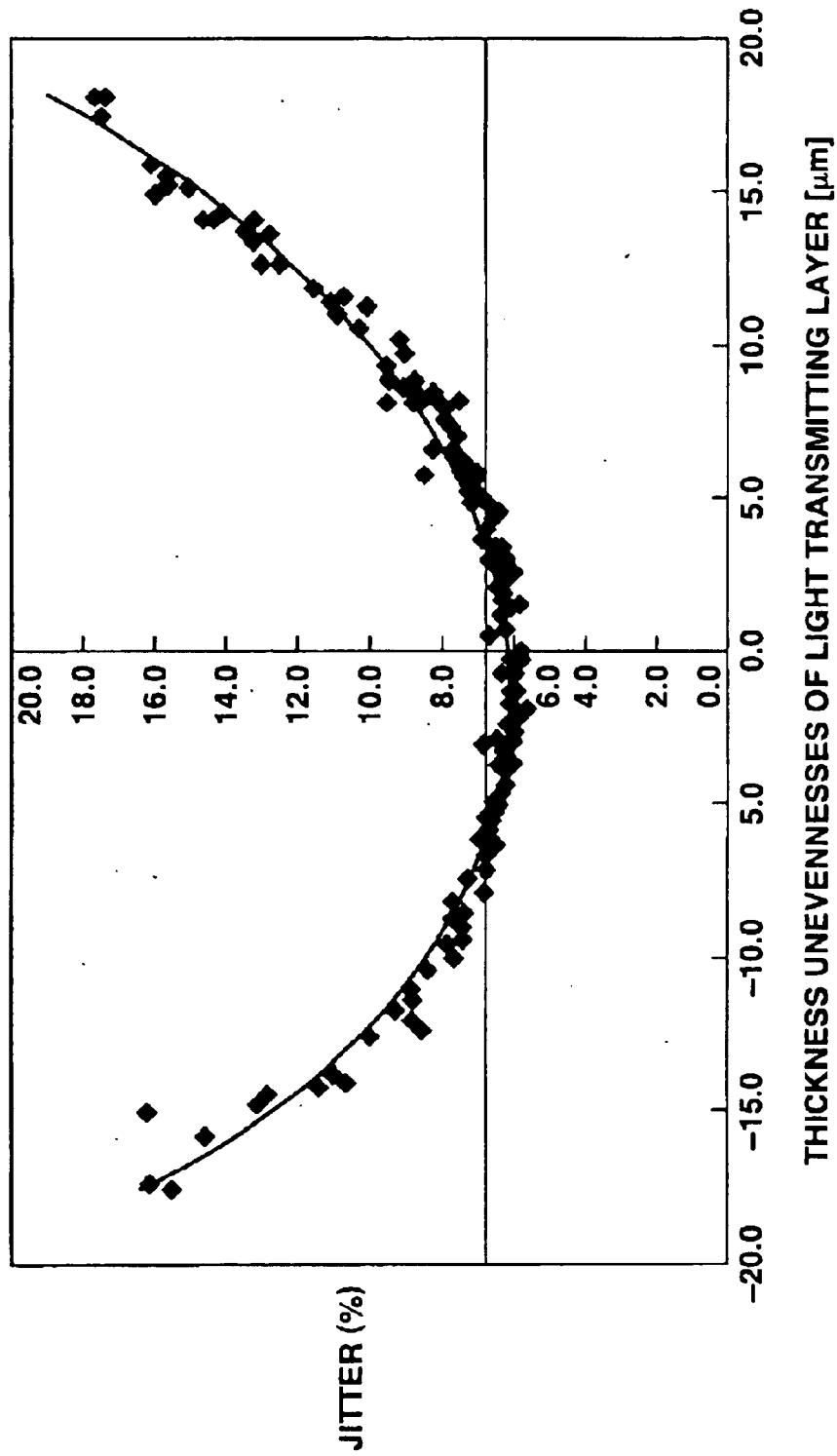
FIG. 3 shows the relationship between thickness errors of the light transmitting layer and jitter.

FIG. 3 shows the results of experimentation on the relationship between the thickness variation of the light transmitting layer and the jitter, for the wavelength of 0.68 µm and NA=0.875 with respect to the center of the thickness of the light transmitting layer 4 of 100 µm.

It is seen from FIG. 3 that the thickness variation of the light transmitting layer 4 is ±7 µm for the reference jitter of 8% in the absence of perturbations such as skew in e.g., a DVD, which is approximately coincident with the value of the above equation. Thus, it may be seen that, with increasing recording density, the thickness variation |Δt| allowed for the thickness t of the light transmitting layer 4 needs to be not larger than $5.26 \times (\lambda/NA^4)[\mu m]$.

Also, the thickness variation of the light transmitting layer 4 is presupposed to be uniform on the uniform recording and/or reproducing light within the area of the illuminated disc surface. The aberration can be corrected by shifting the focussing point.

However, if there is any thickness variation in the light transmitting layer 4 in this area (spot), it cannot be corrected by focussing point adjustment. Therefore, this amount needs to be suppressed to not higher than ±3λ/100 with respect to the value of the center thickness.

As for the eccentricity E, it is given as $$E \leq 50 \times P/0.74 = 67.57 \, P \, \mu m$$

in comparison with 50 µm of a DVD.

From the foregoing, the necessary conditions to realize the high density optical disc 1 with the recording capacity of 8 GB may be defined as follows:
wavelength of the recording and/or reproducing system
λ≦0.68 µm

NA/λ≧1.20 thickness t of the light transmitting layer 4=10 to 177 µm
thickness variation |Δt| of the light transmitting layer
  4≦5.26×(λ/NA⁴)µm
track pitch P≦0.64 µm
allowance |ΔP|≦0.04 P
linear density d≦0.1161/P bit/µm
disc skew margin |Θ|≦184.115 (λ/NA³/t)°
eccentricity E≦67.57P µm
surface roughness |Ra|≦3λ/100 (within a spot-illuminated area).

The depth of the pit or the groove formed on the substrate 2 is explained.

The depth of the pit or the groove which gives the maximum modulation factor is λ/4. The pit as recording signal for playback only is desirably formed to this depth. If, in groove recording or land recording, tracking error signals are to be obtained by push-pull, the push-pull signals are maximum if the pit or the groove depth is λ/8.

If recording is made on both the land and the groove, the groove depth is to be set taking into account not only servo signal characteristics but also cross-talk or cross-erase characteristics. It has empirically determined that the crosstalk is minimum for λ/6 to λ/3, and that the effect of cross-erase is decreased with a deeper groove depth. If both characteristics are to be satisfied taking the tilt of the groove into account, 3λ/8 is optimum. The high recording density optical disc 1 of the present embodiment can be designed to the above-mentioned depth range.

The optical system for recording and/or reproducing this optical disc 1 is hereinafter explained.

Figure 4:
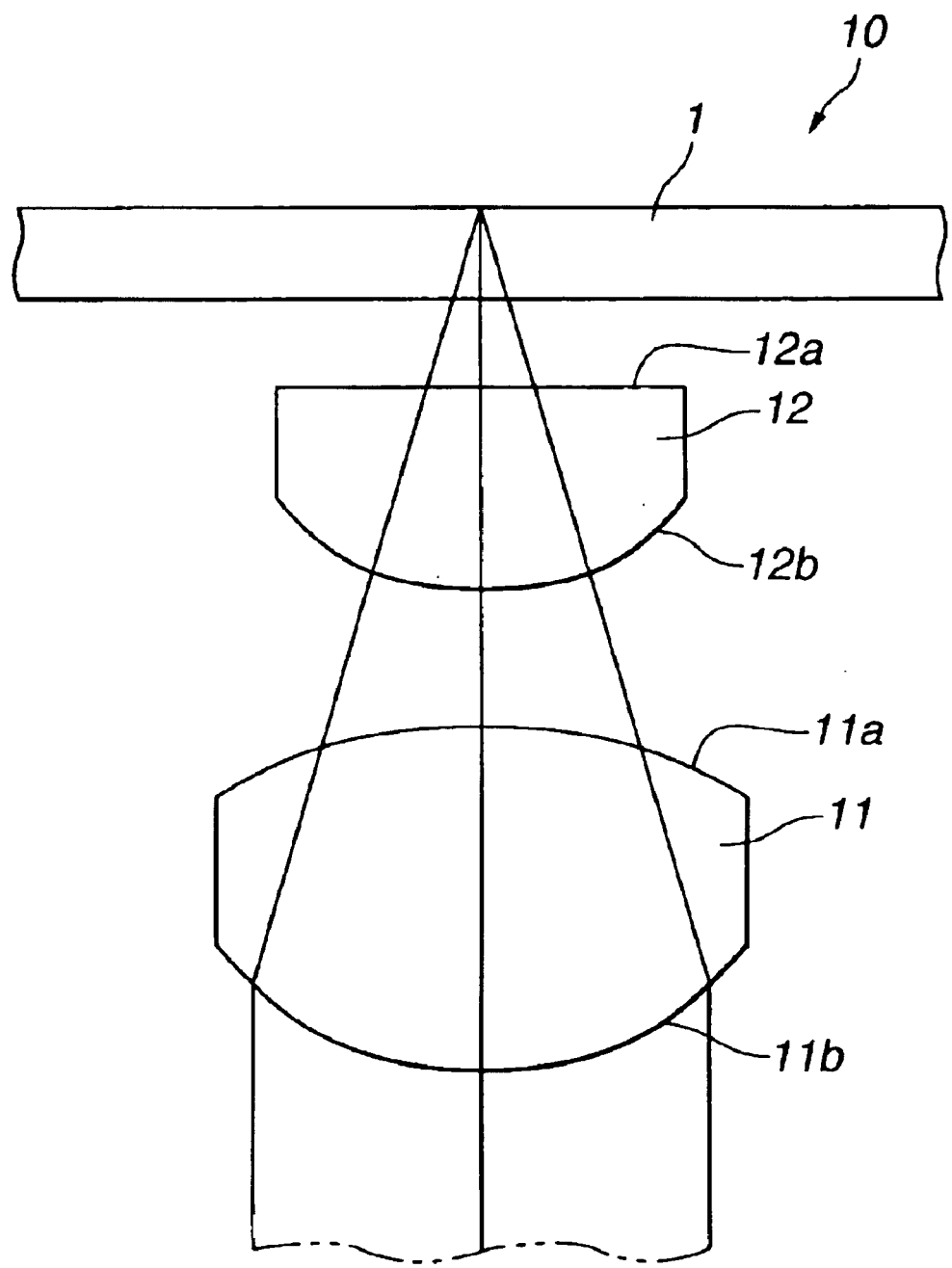
FIG. 4 is a schematic view showing an embodiment of an optical system for recording and/or reproducing the information on or from an optical recording medium according to the present invention.

This optical system 10 is of a double lens structure comprised of a first lens 11 and a second lens 12 arranged between the first lens 11 and the optical disc 1, as shown for example in FIG. 4. With this double-lens structure of the optical system 10, it is possible to set NA to not less than 0.7 to reduce the separation between a first surface 12a of the second lens 12 and the surface of the optical disc 1 (working distance). The first surface 11a and the second surface 11b of the first lens 11 as well as the first surface 12a and the second surface 12b of the second lens 12 are desirably non-spherical surfaces. The high density recording and/or reproduction for the optical disc can be achieved by employing this double lens optical system.

The manufacturing method for the optical disc is hereinafter explained.

Figure 5:
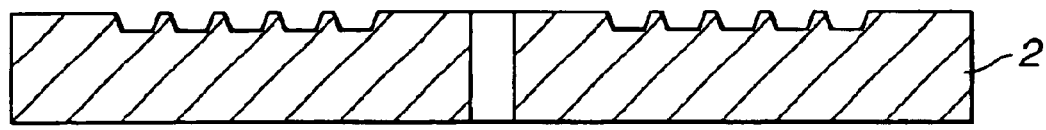
FIG. 5 is a cross-sectional view for illustrating the manufacturing method for the optical recording medium according to the present invention and particularly showing a substrate produced by injection molding.

Referring first to FIG. 5, a substrate 2 is produced by injection-molding a resin material. Since the substrate 2 needs to be of a certain toughness, it is desirably not less than 0.6 mm thickness. At this time, the substrate 2 is formed as one with a pre-set pattern of crests and recesses. Also, a stamper is used which satisfies requirements for the pitch and the pitch variations.

This high precision stamper, suffering from only small pitch variations, is difficult to achieve with the conventional apparatus employing a feed screw. Therefore, it is produced using a master disc light exposure device having a feed mechanism by a linear motor. Moreover, in the optical system of the light exposure device, it is desirably sheathed with a cover for excluding air oscillations, and an anti-vibrational member is desirably provided between the laser and the light exposure device for eliminating vibrations of the cooling water of the light exposure device.

Also, in the present optical disc 1, in which the reflective film 3 is formed on the pattern of crests and recesses formed on the substrate 2, and in which the light is illuminated from the side of the reflective layer 3 for recording and/or reproduction, it is necessary to form pits on the substrate 2 taking into account the signal shape deformation caused by the deposition of the reflective film 3.

For example, if the optical disc 1 is fabricated so as to have the recording capacity of 10 GB, and if signal pit asymmetry when looking from the side of the substrate 2 is 25%, the signal pit asymmetry when looking from the side opposite to the substrate side is 10%. That is, since the optical disc 1 is configured to read signals from the opposite side to the substrate side, the shape asymmetry of the pits formed on the substrate 2 needs to be 25% in order to form pits having the asymmetry of 10% looking from the light illuminating side.

As for the guide groove formed in the substrate 2, the groove duty is varied with the recording film. For example, in the case of the groove recording in a recess looking from the recording and/or reproducing surface, the groove becomes narrow and hence measures need to be taken to increase the width of the stamper used for groove transcription. For example, if recording is to be made both on the crest (land) between the neighboring guide grooves, and in the grooves, the asymmetry looking from the substrate side needs to be set to 60 to 65% in order to achieve the asymmetry of 50% looking from the light illuminating side.

Figure 6:
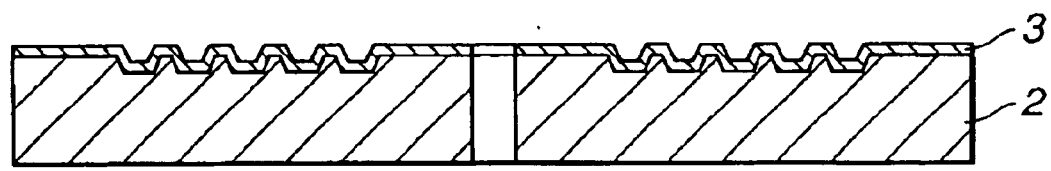
FIG. 6 is a cross-sectional for illustrating the manufacturing method and particularly showing the state in which a reflecting film has been formed on the substrate.

The reflective film 3 of aluminum then is formed to a thickness of 20 to 60 nm on the surface of the substrate 2 carrying the pattern of the crests and recesses, as shown in FIG. 6.

Figure 7:
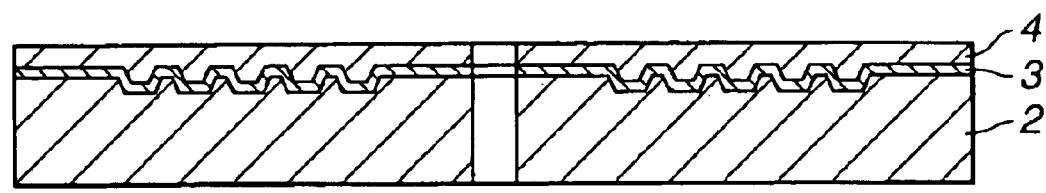
FIG. 7 is a cross-sectional view for illustrating the manufacturing method and particularly showing the state in which a light transmitting layer has been formed on the reflecting film.

A UV light curable resin then is formed on the reflective film 3 by a spin coating method, and cured to form the light transmitting layer 4, as shown in FIG. 7. The thickness of the light transmitting layer 4 is set to, for example, 10 to 177 μm. If the light transmitting layer 4 is formed to the aforementioned thickness, it is desirable to use the UV light curable resin having the viscosity not less than 300 mPa·s and not higher than 3000 mPa·s.

In forming the light transmitting layer 4, the UV light curable resin is supplied dropwise to a position 25 mm away from the center of the disc 1 in the radial direction thereof and stretched on disc rotation. This produces difference in the thickness of the light transmitting layer 4 between the inside and the outside of the disc due to the centrifugal force produced on disc rotation and the viscous resistance of the UV light curable resin. This difference is not less than 30 mm.

For evading this difference in thickness between the inside and the outside of the disc, it is effective to fill out the center opening of the substrate 2, using suitable means, when applying the UV light curable resin dropwise, to apply the UV light curable resin dropwise thereon, to stretch and cure the resin, with the center opening being bored ultimately.

Specifically, a polycarbonate sheet 0.1 mm in thickness is machined to a circular shape with a diameter of 30 mm and bonded in position in the center opening of the substrate. The UV light curable resin is applied dropwise on the polycarbonate sheet, stretched on rotation and cured. Finally, the center opening is punched. With this method, the difference in the thickness of the light transmitting layer 4 across the inner and outer rims of the disc can be suppressed to not larger than 10 μm.

Figure 8:
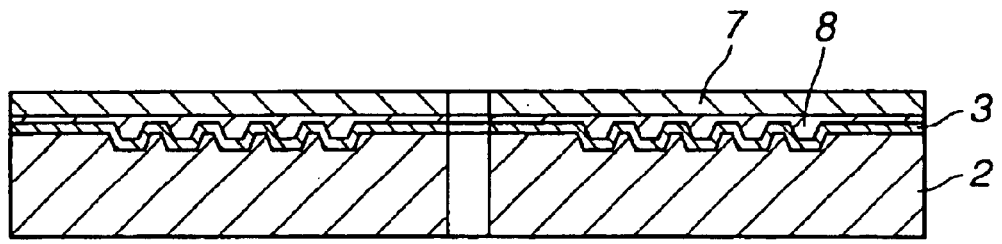
FIG. 8 is a cross-sectional view for illustrating the manufacturing method and particularly showing the state in which another light transmitting layer has been formed on the reflecting film.

Meanwhile, the light transmitting layer 4 may be formed by bonding a sheet 7 of e.g., polycarbonate, 100 μm in thickness, with a UV light curable resin 8, as shown in FIG. 8. In this case, the sum of the thickness variation of the sheet 7 and the thickness variation of the UV light curable resin 8 equal to 10 μm suffices. For example, the thickness variation of the light transmitting layer 4 can be within 10 μm by bonding the sheet 7, machined to the same diameter as the substrate 8, to the substrate 2, using the UV light curable resin 8 for bonding, and the light transmitting layer is ultimately formed on rotation for stretching to give the thickness variation of the light transmitting layer 4 not larger than 10 μm.

In forming the light transmitting layer 4, it may be feared that the UV light curable resin 8 be exuded from the outer rim of the substrate 2. Therefore, the diameter of the substrate 2 is desirably set to a maximum value of 120 mm+5 mm with the diameter of the CD 0f 120 mm as a reference.

Figure 9:
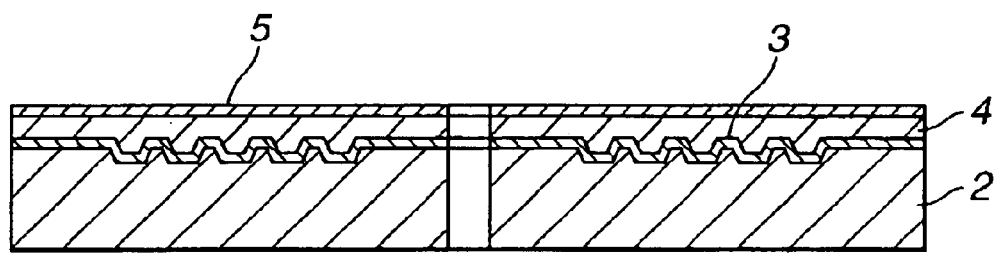
FIG. 9 is a cross-sectional view for illustrating the manufacturing method and particularly showing the state in which a surface layer has been formed on the light transmitting layer.

An organic material of, for example, $SiN_x$, $SiO_x$ or SiC is deposited, such as by sputtering, on the light transmitting layer 4, to form the light-transmitting surface layer 5, as shown in FIG. 9. The thickness of the surface layer 5 is preferably 10 to 2000 Å, for example, 1000 Å.

The surface layer 5 may be electrically conductive by being formed of, for example, indium oxide, tin oxide, singly or in combination, or amorphous carbon. The thickness of the surface layer 5 may, for example, be approximately 500 Å. The electrically conductive surface layer 5 is effective to prevent electrification of the disc surface to prevent deposition of dust or dirt thereon.

On the surface layer 5, an amine salt compound of perfluoropolyether having carboxylic terminal groups, as shown by the following formula (1) and/or the formula (2):

where $R_f$ denotes a perfluoropolyether group and $R_1$, $R_2$ and $R_3$ denote hydrogen or a hydrocarbon group, is deposited on the surface layer 5.

For coating these compounds on the surface layer 5, a solution obtained on dissolving the compounds in a solvent is coated or sprayed onto the surface layer 5. Alternatively, these compounds may be supplied to the surface layer 5 by immersing the optical disc 1 in the solution.

In the above-described embodiment, the optical disc 1 of the replay only type (ROM) comprised of the substrate 2 and the reflective film 3 formed thereon is taken as an example. The present invention is, however, not limited to this embodiment and may also be applied to an overwritable optical disc or a write-once optical disc. The overwritable optical disc may be enumerated by a magneto-optical disc having a signal recording layer on the substrate 2 and a phase change optical disc.

The signal recording layer of the magneto-optical disc is formed by an Al film, a $SiN_x$ film, a TeFeCo film and a $SiN_x$ film, deposited in this order. It is noted that the Al film serves as a reflective film, whilst the TeFeCo film serves as a recording film exhibiting a photomagnetic effect. On the other hand, the $SiN_x$ film serves as a dielectric film.

The signal recording layer of the phase-change optical disc is comprised of an Al film, a $ZnS$—$SiO_2$ film, a GeSbTe film and a $ZnS$—$SiO_2$ film, layered in this order. The Al film serves as a reflective film, whilst the GeSbTe film serves as a recording film subjected to phase change. The $ZnS$—$SiO_2$ films serve as dielectric films.

The signal recording layer of the write-once optical disc is formed by forming a reflective film on the substrate by sputtering Au or Al, coating a film of an organic methalocyanine or phthalocyanine dye on the reflective film and drying the resulting the resulting product in situ.

Figure 10:
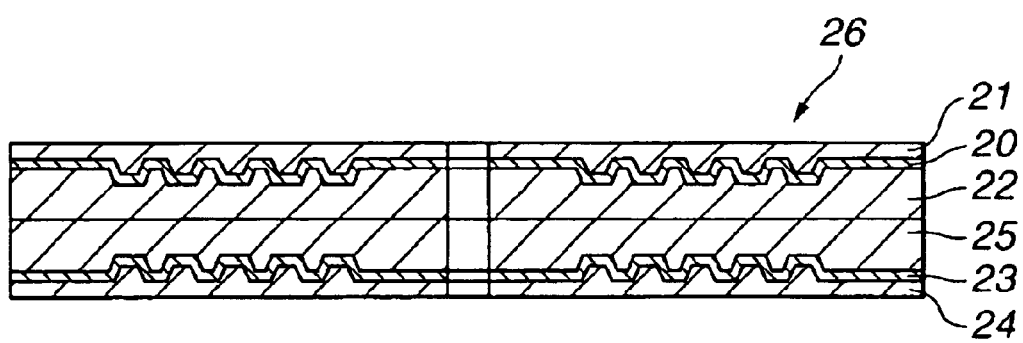
FIG. 10 is a cross-sectional view showing a third illustrative embodiment of an optical recording medium according to the present invention.
Figure 11:
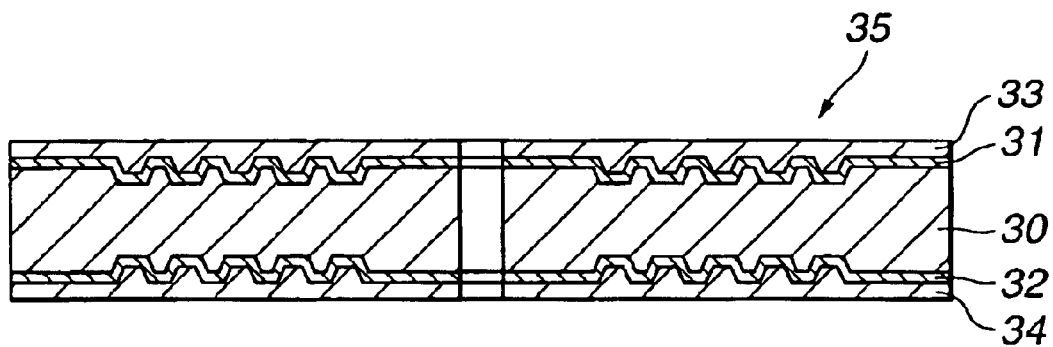
FIG. 11 is a cross-sectional view showing a fourth illustrative embodiment of an optical recording medium according to the present invention.
Figure 12:
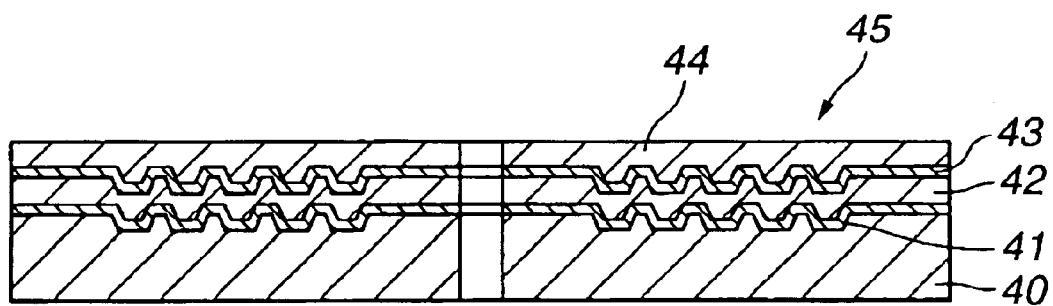
FIG. 12 is a cross-sectional view showing a fifth illustrative embodiment of an optical recording medium according to the present invention.

In the above-described embodiment, the optical disc 1 of a single plate structure, comprised of the sole substrate 2, on one surface of which is formed the reflective film 3, is taken as an example. The present invention is, however, not limited to this configuration. For example, the present invention may be applied to an optical disc 26 including a first substrate 22 and a second substrate 26, bonded together, in which the first substrate 22 has a recording layer 20 and a light transmitting layer 21, and the second substrate 26 has a recording layer 23 and a light transmitting layer 24, as shown in FIG. 10. Alternatively, the present invention may be applied to an optical disc 35 including a sole substrate 30 on one surface of which are bonded a recording layer 31 and a light transmitting layer 33 and on the other surface of which are bonded a recording layer 32 and a light transmitting layer 34, as shown in FIG. 11. Still alternatively, the present invention may be applied to an optical disc 45 including a substrate 40 on a first recording layer of which a second recording layer 43 is formed via an intermediate layer 42 and in which a light transmitting layer 44 is formed on the second recording layer 43, as shown in FIG. 12. If the optical disc is of a structure comprised of two substrates bonded together, as shown in FIG. 10, the respective substrates are each of a thickness one-half that of the substrate of the single plate structure optical disc.

In the above-described embodiment, a substrate having a pre-set pattern of crests and recesses is produced by injection molding a resin material. However, the pattern of crests and recesses may be formed by the following method.

First, a polycarbonate sheet is prepared by injection molding or casting. This sheet 50 has a thickness of, for example, apparatus 100 $\mu$m.

Figure 13:
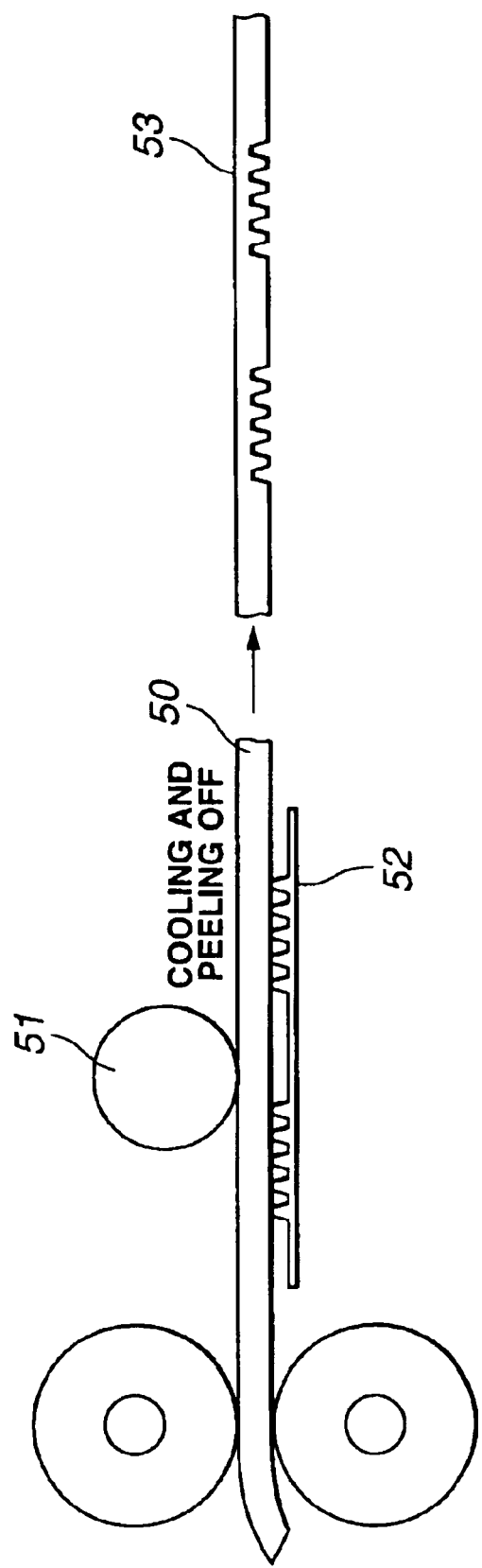
FIG. 13 is a schematic view for illustrating another manufacturing method of an optical recording medium according to the present invention and particularly showing the state in which irregularities on a stamper are transcribed on a sheet.

This sheet 50 is pressure-bonded by a roll 51 to a stamper 52, as shown in FIG. 13. At this time, the stamper is heated to a temperature higher than the glass transition temperature of the material of the sheet 50. The pattern of crests and recesses of the stamper 52 then is transcribed to the sheet 50 by being pressed against the stamper 52 under the stress of, for example, 2750 N. After cooling the sheet 50 and the stamper 52, the sheet 50 is peeled from the stamper 52 to form a thin substrate sheet 53 carrying the pattern of crests and recesses. The recording layer or the reflective film is then formed on the thin substrate sheet 53 as in the method described above.

Figure 14:
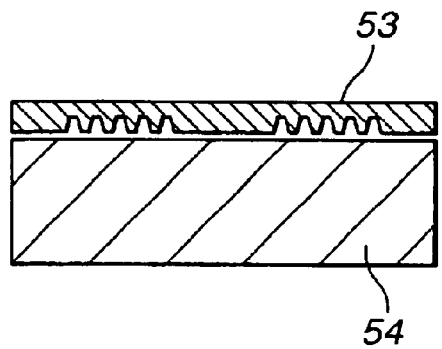
FIG. 14 is an exploded perspective view showing a sixth illustrative embodiment of the optical recording medium according to the present invention.

On a transparent substrate 54, with a thickness of, for example, 1.1 mm, prepared separately by injection molding, a UV light curable resin is applied dropwise and the thin substrate sheet 53 then is set and pressed thereto, as shown in FIG. 14. From the side of the transparent substrate 54, UV light is illuminated to cure the UV light curable resin to bond the thin substrate sheet 53 to the transparent substrate 54 to produce the optical disc.

Figure 15:
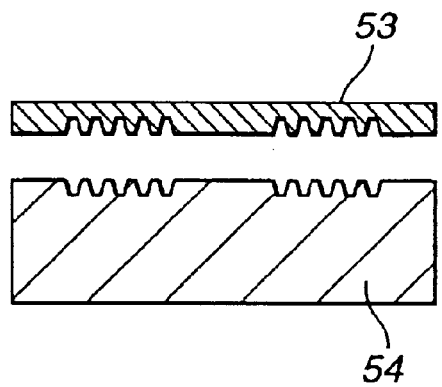
FIG. 15 is an exploded perspective view showing a seventh illustrative embodiment of the optical recording medium according to the present invention.
Figure 16:
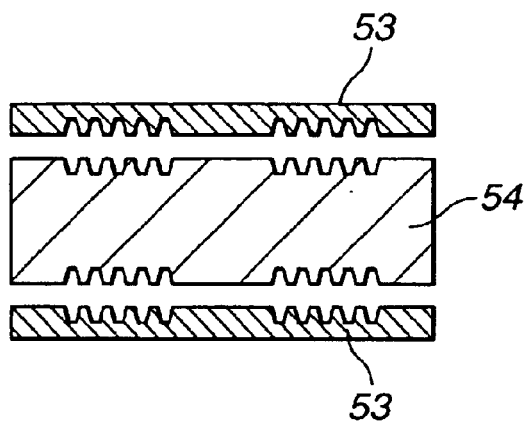
FIG. 16 is an exploded perspective view showing an eighth illustrative embodiment of the optical recording medium according to the present invention.

If, in injection molding the transparent substrate 54, a pre-set pattern of crests and recesses is formed on this transparent substrate 54, it is possible to produce an optical disc of the dual-layer structure as shown in FIG. 15 or an optical disc of a four-layer structure as shown in FIG. 16.

EXAMPLES

The present invention is hereinafter explained with reference to specified Examples. The present invention is, however, not limited to these Examples.

First, a substrate was prepared by injection molding a resin material using a stamper. At this time, a pre-set pattern of crests and recesses was formed as-one on one of the major surfaces of the substrate. On this major surface of the substrate, carrying the pattern of crests and recesses, an Al film, a $SiN_x$ film, a TeFeCo film and a $SiN_x$ film were formed in this order to form a recording layer. On this recording layer was coated and cured a UV light curable resin to form a light transmitting layer having a thickness of 20 $\mu$m. Then, $SiN_x$ was deposited by sputtering on the light transmitting layer to a thickness of 160 nm to form a surface layer. Finally, a compound 1 shown in Table 1 was dissolved in a mixed solvent composed of hexane and ethanol bearing a hexane-ethanol weight ratio of 1:1 and the resulting solution was top-coated on the surface layer at a coating amount of 5 mg/m$^2$ to prepare an optical disc. This optical disc is a magneto-optical disc in which the TeFeCo film exhibits the photomagnetic effect.

The various characteristics of the optical disc, prepared as explained above, are indicated as follows:

wavelength of the recording and/or reproducing system $\lambda \leq 0.68$ $\mu$m $NA/\lambda \geq 1.25$ thickness t of the light transmitting layer 4=20 $\mu$m
thickness variation $|\Delta t|$ of the light transmitting layer $4 \leq 5.0$ $\mu$m
track pitch $P \leq 0.64$ $\mu$m
allowance $|\Delta p| \leq 0.04P$
line density $d \leq 0.1161/P$ bit/$\mu$m
disc skew margin $|\Theta| \leq 0.4°$
eccentricity $E \leq 67.57P$ $\mu$m
surface roughness $|Ra| \leq 3\lambda/100$ (within the spot-illuminated area).

Samples of optical discs were prepared using different compounds top-coated on the surface layer. The optical discs top-coated with compounds 1 to 13 shown in Tables 1 and 2 were prepared as Examples 1 to 13.

An optical disc not having any top coat was prepared as Comparative Example 1. On the other hand, optical discs top-coated with perfluoropolyether having terminal carboxyl groups, manufactured by MONTEGISON INC. under the trade name of Z-DIAC, and with a perfluoropolyether, having a terminal hydroxyl group, manufactured by MONTEGISON INC. under the trade name of Z-DOL, were prepared as Comparative Examples 2 and 3.

TABLE 1

$R_1R_2R_3N^+HO^-CO—R_f—COO^-N^+HR_1R_2R_3$

|  | $R_f$ | $R_1$ | $R_2$ | $R_3$ |
| --- | --- | --- | --- | --- |
| compound 1 | $R_{f1}$ | H | H | $C_{18}H_{37}$ |
| compound 2 | $R_{f1}$ | $C_2H_5$ | $C_2H_5$ | $C_{18}H_{25}$ |
| compound 3 | $R_{f1}$ | $C_{12}H_{25}$ | $C_{12}H_{25}$ | $C_{12}H_{25}$ |
| compound 4 | $R_{f1}$ | $CH_3$ | $CH_3$ | $C_{18}H_{37}$ |
| compound 5 | $R_{f1}$ | $CH_3$ | $CH_3$ | $C_{12}H_{25}$ |
| compound 6 | $R_{f1}$ | $C_6H_5$ | $C_6H_5$ | $C_{18}H_{37}$ |
| compound 7 | $R_{f2}$ | H | H | $C_{10}H_{21}$ |
| compound 8 | $R_{f2}$ | H | H | $C_{12}H_{25}$ |
| compound 9 | $R_{f2}$ | H | H | $C_{18}H_{37}$ |
| compound 10 | $R_{f2}$ | H | H | $C_{18}H_{25}$ |

$R_{f1}$: —$(OCF_2CF_2)_i$—$(OCF_2)_j$—

$R_{f2}$: —$(OCD_2CF)_i$—
               |
              $CF_3$ where i and j are integers not less than 1.

TABLE 2

F—$R_f$—COO$^-$N$^+$$R_1R_2R_3$

|  | $R_f$ | $R_1$ | $R_2$ | $R_3$ |
| --- | --- | --- | --- | --- |
| compound 11 | $R_{f3}$ | H | H | $C_{18}H_{37}$ |
| compound 12 | $R_{f3}$ | $C_2H_5$ | $C_2H_5$ | $C_{12}H_{25}$ |
| compound 13 | $R_{f3}$ | H | $C_{12}H_{25}$ | $C_{12}H_{25}$ |

$R_{f3}$: —$(CF_2CF_2CF_2O)_k$— where k is an integer not less than 1.

On the respective discs, prepared as explained above, evaluation tests were conducted as to sliding durability, frictional coefficients and anti-electrification effects.

As to the sliding durability, an optical pickup having a high NA optical pickup was used and, as a small shearing load of 0.02 N was applied to the optical disc, the disc was slid 100 times, and measurements were made of changes in the error rate for evaluation. Also, damages to the optical disc due to impact at the time of collision between the optical disc and the optical pickup were observed and evaluated.

The frictional coefficients were evaluated by simultaneously measuring the shearing force at the time of measurement of the sliding test and by calculating surface frictional coefficients after sliding 100 times.

The anti-electrification effects were evaluated by applying a voltage of 8.5 kV to the optical disc for one minute and measuring the time until the voltage is decreased to a half value of 4.25 kV, that is the half-life time.

Table 3 shows the results of evaluation on the sliding durability, frictional coefficients and anti-electrification effects on the respective optical discs.

TABLE 3

|  | changes in error rate | damages to medium | friction coefficients | half-life time (s) |
|---|---|---|---|---|
| EX. 1 | 2.0E-4→2.3E-4 | none | 0.17 | 1 |
| EX. 2 | 2.4E-4→2.9E-4 | none | 0.20 | 1 |
| EX. 3 | 2.6E-4→3.5E-4 | only slight | 0.21 | 2 |
| EX. 4 | 2.4E-4→2.8E-4 | none | 0.18 | 1 |
| EX. 5 | 2.6E-4→3.5E-4 | only slight | 0.21 | 1 |
| EX. 6 | 2.2E-4→2.8E-4 | none | 0.19 | 1 |
| EX. 7 | 2.9E-4→4.2E-4 | only slight | 0.25 | 3 |
| EX. 8 | 2.8E-4→3.2E-4 | none | 0.19 | 4 |
| EX. 9 | 3.0E-4→3.8E-4 | only slight | 0.23 | 2 |
| EX. 10 | 2.7E-4→3.0E-4 | none | 0.19 | 1 |
| EX. 11 | 2.6E-4→3.6E-4 | only slight | 0.23 | 3 |
| EX. 12 | 2.4E-4→2.8E-4 | none | 0.19 | 2 |
| EX. 13 | 2.4E-4→2.8E-4 | none | 0.18 | 1 |
| COMP. EX. 1 | 5.1E-3→1.2E-2 | large and deep | 0.52 | 51 |
| COMP. EX. 2 | 8.2E-4→4.1E-3 | damaged | 0.35 | 32 |
| COMP. EX. 3 | 1.5E-3→9.5E-3 | damaged | 0.48 | 27 |

It is seen from these results that, with the optical discs of Examples 1 to 13, top-coated with the compounds of the present invention, rise in the error rate due to sliding is scarcely observed, whilst the medium is scarcely damaged. It is also seen that, with these optical discs, the frictional coefficients are extremely low. Thus, these optical discs are able to run in stability even in cases wherein the discs are in sliding contact with the optical pickup, such that, if the recording signals are miniaturized for achieving a high recording density, correct recording and/or reproduction is possible. Moreover, these optical discs have been confirmed to be superior in anti-electrification effects. Thus, with these optical discs, impurities can be prevented from being deposited on the light transmitting layer to reduce recording and/or reproducing errors.

Conversely, the optical disc of the Comparative Example 1, not top-coated, suffers from rise in error rate, damages to the medium, frictional coefficients and in anti-electrification properties, such that the disc is not suited for use as a high recording density optical disc with a small working distance. The optical discs of the Comparative Examples 2 and 3, top-coated with perfluoropolyether, having carboxylic or hydroxyl groups, exhibit properties superior to those of the optical disc of the Comparative Example 1, however, no sufficient result has been obtained for use as a high recording density optical disc. The reason the optical discs of the Comparative Examples 2 and 3 do not exhibit sufficient characteristics is possibly that no inoic bonds are present in the molecule of the material coated as a lubricant.

It has thus been seen that, by top-coating the surface layer 5 with an amine salt compound of perfluoropolyether having terminal carboxylic groups, it is possible to prevent damages to the disc surface as well as deposition of impurities on the disc surface to reduce the recording and/or reproducing errors.

What is claimed is:

1. A disc-shaped optical recording medium, comprising:

a support having at least two major surfaces;

a recording portion formed on one of the major surfaces of the support for recording signals thereon;

a light transmitting layer formed of one of a polycarbonate sheet and a UV light curable resin, on the recording portion, said light transmitting layer having a thickness t of 10 to 177 μm;

wherein the light transmitting layer comprises a surface that is configured to receive and transmit illuminating light to the recording portion to record and/or reproduce signals;

a surface layer formed of an amine salt compound held on the surface of the light transmitting layer, wherein the amine salt compound is a compound of perfluoropolyether having terminal carboxylic groups, represented by the chemical formulas (1) and/or (2):

  (formula 1)

  (formula 2)

where $R_f$ denotes a perfluoropolyether group and $R_1$, $R_2$ and $R_3$ denote hydrogen or a hydrocarbon group, and wherein the perfluoropolyether group $R_f$ is represented by the formulas (3), (4), and/or (5):

  (formula 3)

  (formula 4)

  (formula 5)

where l, j, m, n, p, and q denote integers not less than 1;

wherein a surface resistance of that side of the optical recording medium having the amine salt is not larger than $10^{13}$ Ω; and wherein the dynamic frictional coefficient of that side of the optical recording medium having the amine salt is not higher than 0.3; and a skew correcting member on a second of said two major surfaces of said support, said second of said two major surfaces being disposed on a side opposite to a side of said support on which said light transmitting layer is disposed.

2. The optical recording medium according to claim 1, wherein the terminal carboxylic groups are represented by both formula 1 and formula 2, and wherein at least one of $R_1$, $R_2$ and $R_3$ in the formulas (1) and (2) is a long-chain hydrocarbon having 10 or more carbon atoms.

3. The optical recording medium according to claim 1, wherein the light transmitting layer satisfies the relationship:

$$|\Delta t| \leq 5.26 \times (\lambda/NA^4) \mu m,$$

where Δt is thickness variation of the light transmitting layer and NA and λ are the numerical aperture and the wavelength of the optical recording medium.

4. The optical recording medium according to claim 1, wherein a surface hardness of that side of the optical recording medium having the amine salt is not less than H in terms of pencil hardness.

5. The optical recording medium according to claim 1, wherein a light-transmitting surface layer is formed between the light transmitting layer and the amine salt compound.

6. The optical recording medium according to claim 5, wherein the light-transmitting surface layer is formed of an inorganic material.

7. The optical recording medium according to claim 6, wherein the inorganic material is one of SiNx, SiC, and SiOx.

8. The optical recording medium according to claim 6, wherein the light-transmitting surface layer is formed by at least one of sputtering and spin-coating and has a thickness of 1 to 200 nm.

9. The optical recording medium according to claim 5, wherein the light-transmitting surface layer is formed of an electrically conductive inorganic material.

10. The optical recording medium according to claim 9, wherein the inorganic material is at least one of indium oxide and tin oxide, either alone or in composition.

11. The optical recording medium according to claim 9, wherein the light-transmitting surface layer is formed by at least one of sputtering and spin coating to a thickness of 1 to 200 nm.

12. The optical recording medium according to claim 5, wherein the light-transmitting surface layer is formed of an organic resin.

13. The optical recording medium according to claim 12, wherein the light-transmitting surface layer is formed by spin coating to a thickness of 0.1 to 10 $\mu$m.

14. The optical recording medium according to claim 12, wherein the light-transmitting surface layer is formed of an organic resin admixed with powders of oxides of at least one of metals In, Sn, and Zn, and wherein the light-transmitting surface layer is formed by spin coating to a thickness of 0.1 to 100 $\mu$m.

15. The optical recording medium according to claim 12, wherein a surface tension of the light-transmitting surface layer is set to a value that is smaller than a critical surface tension of the light transmitting layer.

16. The optical recording medium according to claim 12, wherein a moisture absorption ratio of the light-transmitting surface layer is set to be higher than a moisture absorption ratio of the light transmitting layer.

17. The optical recording medium according to claim 5, wherein the light-transmitting surface layer is electrically conductive.

18. The optical recording medium according to claim 1, wherein said skew correcting member is formed by coating and curing a UV curable resin.

19. The optical recording medium according to claim 18, wherein a disk skew margin of the optical disc is less than or equal to 84.115($\lambda$/NA$^3$/t);

wherein t is a thickness of the light transmitting layer, and NA and $\lambda$ are a numerical aperture and a wavelength, respectively, of the optical recording medium.

20. The optical recording medium according to claim 1, wherein the optical disc is one of a replay only disc (ROM), an overwritable optical disc, and a write-once optical disc.

21. The optical recording medium according to claim 1, wherein said support comprises a first substrate and a second substrate bonded together.

22. The optical recording medium according to claim 1, wherein said two major surfaces of said support include a recording layer and a light transmitting layer bonded to one another.

23. The optical recording medium according to claim 1, wherein said support includes a first recording layer formed thereon, an intermediate layer formed on said first recording layer, a second recording layer formed on said intermediate layer, and said light transmitting layer formed on said second recording layer.

24. A disc-shaped optical recording medium, comprising:

a support comprising a first substrate and a second substrate bonded together and having at least two major surfaces;

a recording portion formed on one of the major surfaces of the first substrate and on one of the major surfaces of the second substrate for recording signals thereon;

a light transmitting layer formed on the recording portion of the first substrate and of the second substrate, wherein the light transmitting layer has a thickness t of 10 to 177 $\mu$m, and comprises a surface that is configured to receive and transmit illuminating light to the recording portion to record and/or reproduce signals;

a surface layer formed of an amine salt compound having a predetermined hardness and held on the surface of the light transmitting layer, wherein the amine salt compound is a compound of perfluoropolyether having terminal carboxylic groups, represented by the chemical formulas (1) and/or (2):

 (formula 1)

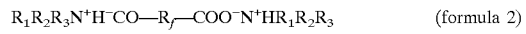 (formula 2)

where R$_f$ denotes a perfluoropolyether group and R$_1$, R$_2$ and R$_3$ denote hydrogen or a hydrocarbon group, and wherein the perfluoropolyether group R$_f$ is represented by the formulas (3), (4), and/or (5):

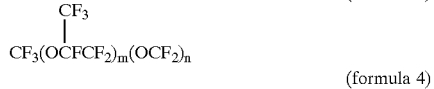

(formula 3)

(formula 4)

 (formula 5)

wherein l, m, n, p, and q denote integers not less than 1;

wherein said surface layer has a thickness of 1 to 200 nm, and a dynamic frictional coefficient equal to 0.3 or less; and a skew correcting member on a second of said two major surfaces of said support, said second of said two major surfaces being disposed on a side opposite to a side of said support on which said light transmitting layer is disposed;

wherein said skew correcting member is formed by coating and curing a UV curable resin.

* * * * *